(12) United States Patent
Krogue et al.

(10) Patent No.: US 7,718,071 B2
(45) Date of Patent: May 18, 2010

(54) TREATMENT OF CONTAMINATED FLUIDS

(75) Inventors: John A. Krogue, Mineral Wells, TX (US); Timothy L. Holmes, Kingwood, TX (US)

(73) Assignee: Perry Equipment Corporation, Mineral Wells, TX (US)

( * ) Notice: Subject to any disclaimer, the term of this patent is extended or adjusted under 35 U.S.C. 154(b) by 0 days.

(21) Appl. No.: 12/341,509

(22) Filed: Dec. 22, 2008

(65) Prior Publication Data

US 2009/0159531 A1 Jun. 25, 2009

Related U.S. Application Data

(62) Division of application No. 11/731,704, filed on Mar. 30, 2007, now Pat. No. 7,485,225.

(60) Provisional application No. 60/788,260, filed on Mar. 31, 2006.

(51) Int. Cl.
*B01J 49/00* (2006.01)

(52) U.S. Cl. .................... 210/671; 210/688; 210/689; 210/690; 210/691; 210/692; 210/693

(58) Field of Classification Search .............. 210/671, 210/688, 689–693
See application file for complete search history.

(56) References Cited

U.S. PATENT DOCUMENTS

| | | | |
|---|---|---|---|
| 4,101,423 A | 7/1978 | Merrill et al. ............... 210/494 |
| 4,153,661 A | 5/1979 | Ree et al. .................... 264/120 |
| 4,266,408 A * | 5/1981 | Krause ......................... 62/474 |
| 4,986,909 A | 1/1991 | Rai et al. .................. 210/198.3 |
| 5,057,368 A | 10/1991 | Largman et al. ............ 428/397 |
| 5,062,948 A | 11/1991 | Kawazoe et al. ........ 208/251 R |
| 5,114,582 A | 5/1992 | Sandstrom et al. ..... 210/321.74 |
| 5,133,864 A | 7/1992 | Vaughn et al. .............. 210/437 |
| 5,189,092 A * | 2/1993 | Koslow ...................... 524/495 |
| 5,227,071 A | 7/1993 | Torline et al. ............... 210/651 |
| 5,264,162 A | 11/1993 | Salem et al. ............... 264/29.5 |
| 5,358,552 A | 10/1994 | Seibert et al. ................. 95/281 |
| 5,409,515 A | 4/1995 | Yamamoto et al. ......... 55/341.1 |
| 5,466,364 A | 11/1995 | Kaul et al. .................. 208/307 |
| 5,510,565 A | 4/1996 | Tan et al. .................... 585/823 |
| 5,626,748 A | 5/1997 | Rose .......................... 210/241 |

(Continued)

OTHER PUBLICATIONS

Richardeau et al., "Adsorption and Reaction Over HFAU Zeolites of Thiophene in Liquid Hydrocarbon Solutions", Applied Catalysis A: General, vol. 263, Issue 1, Available online Feb. 3, 2004, pp. 49-61.

(Continued)

*Primary Examiner*—Chester T Barry
(74) *Attorney, Agent, or Firm*—Chinh H. Pham; Greenberg Traurig, LLP

(57) ABSTRACT

An apparatus for use in the treatment of contaminated fluid is provided. The apparatus includes a body portion, made from a mixture of a waste adsorbent material and a binder material, for use in the removal of contaminants. The adsorbent material may be a nanosorbent material manufactured from self-assembled monolayers on mesoporous supports (SAMMS). The binder material, on the other hand, may include any thermoplastic material capable of binding the adsorbent material together to subsequently provide a composite material that can be shaped into a block. A method for treatment of contaminated fluid is also provided.

13 Claims, 4 Drawing Sheets

U.S. PATENT DOCUMENTS

| | | | |
|---|---|---|---|
| 5,668,079 A | 9/1997 | Tavlarides et al. | 502/407 |
| 5,762,797 A | 6/1998 | Patrick et al. | 210/497.1 |
| 5,827,430 A | 10/1998 | Perry, Jr. et al. | 210/497.01 |
| 5,897,779 A | 4/1999 | Wisted et al. | 210/651 |
| 5,902,480 A | 5/1999 | Chilton et al. | 210/317 |
| 6,274,041 B1 | 8/2001 | Williamson et al. | 210/243 |
| 6,309,546 B1 | 10/2001 | Herrmann et al. | 210/500.25 |
| 6,326,326 B1 * | 12/2001 | Feng et al. | 502/62 |
| 6,436,294 B2 | 8/2002 | Lundquist | 210/674 |
| 6,492,183 B1 | 12/2002 | Perman et al. | 436/178 |
| 6,733,828 B2 * | 5/2004 | Chao et al. | 427/239 |
| 6,887,381 B2 | 5/2005 | Rohrbach et al. | 210/502.1 |
| 7,008,471 B2 | 3/2006 | Koyama et al. | 96/131 |
| 7,144,445 B2 | 12/2006 | Gueret et al. | 95/96 |
| 7,282,259 B2 * | 10/2007 | Ku et al. | 428/307.7 |
| 7,393,381 B2 | 7/2008 | Tower et al. | 95/8 |
| 2001/0042440 A1 | 11/2001 | Miyazawa et al. | 95/139 |
| 2002/0020292 A1 | 2/2002 | Wojtowicz et al. | 95/116 |
| 2003/0034293 A1 | 2/2003 | Simonetti | 210/321.74 |
| 2003/0181561 A1 | 9/2003 | Li et al. | 524/425 |
| 2005/0103713 A1 | 5/2005 | Ramsey et al. | 210/649 |
| 2005/0205469 A1 | 9/2005 | Klabunde et al. | 208/208 |
| 2007/0071657 A1 | 3/2007 | Okubo et al. | 422/186.03 |
| 2008/0099375 A1 | 5/2008 | Landau et al. | 208/244 |
| 2008/0128364 A1 | 6/2008 | Cloud et al. | 210/767 |

OTHER PUBLICATIONS

Lin et al., "Selective Sorption of Cesium Using Self-Assembled Monolayers on Mesoporous Supports", Environmental Science & Technology, vol. 35, No. 19, published on Web Aug. 24, 2001, pp. 3962-3966.

* cited by examiner

TREATMENT OF CONTAMINATED FLUIDS

RELATED APPLICATION(S)

The present application is a divisional of U.S. application Ser. No. 11/731,704, filed Mar. 30, 2007 now U.S. Pat. No. 7,485,225, which claims priority to U.S. Provisional Patent Application Ser. No. 60/788,260, filed Mar. 31, 2006, both of which are hereby incorporated herein by reference.

TECHNICAL FIELD

The present invention relates to an apparatus and method for treatment of contaminated fluids, and more particularly, to a composite block incorporating self-assembled monolayers on mesoporous supports (SAMMS) in the removal of toxic heavy metals from contaminated fluids.

BACKGROUND ART

Produced fluid, such as water from offshore oil platforms can contain toxic heavy metals, for instance, mercury. In the Gulf of Mexico, mercury levels rarely exceed 100 parts per billion (ppb). However, in the Gulf of Thailand, the average concentration of mercury in produced water can range from about 200 ppb to about 2,000 ppb.

Discharge of mercury into the marine environment in U.S. territorial waters is currently regulated by the U.S. Environmental Protection Agency (EPA) under the Clean Water Act via the National Pollutant Discharge Elimination System permit process. According to environmental standards under 40 CFR §131.36 for marine environment, limits include about 1800 ppb for acute exposure and about 25 ppb for chronic exposure. International standards for mercury discharges in produced water, on the other hand, range from about 5 ppb in Thailand to about 300 ppb in the North Sea.

Produced water often contains oil that was removed with the water during the bulk oil/water separation process. As an example, the produced water from the North Sea fields contains about 15-30 parts per million (ppm) dispersed oil with benzene, toluene, ethylbenzene, and xylene (BTEX); naphthalene, phenanthrene, dibenzothiophene (NPD), polycyclic aromatic hydrocarbon (PAH), phenol, and organic acid concentrations ranging from about 0.06 ppm to about 760 ppm. Additionally, these produced waters contain toxic heavy metals, such as mercury, cadmium, lead, and copper in concentrations ranging from less than about 0.1 ppb to about 82 ppb. The presence of a complex mix of constituents coupled with a high concentration of dissolved salts can present a challenge for heavy metal removal using currently available conventional technologies.

In particular, existing technologies for metal and mercury removal from diluted wastewater include activated carbon adsorption, sulfur-impregnated activated carbon, microemulsion liquid membranes, ion exchange, and colloid precipitate flotation. These technologies may not suitable for water treatment because of poor metal loading (e.g., metal uptake less than 20% of the mass of the adsorber material) and selectivity, (interference from other abundant ions in groundwater). In addition, the mercury may be present in species other than elemental. So the method must be able to remove these other species, such as methyl mercury etc. Furthermore, they lack stability for metal-laden products so that they are not disposable directly as a permanent waste form. As a result, secondary treatment is required to dispose or stabilize the separated mercury or the mercury-laden products. Mercury removal from non-aqueous sludge, adsorbed liquids, or partially- or fully-stabilized sludges, and mercury-contaminated soil is difficult because (1) the non-aqueous nature of some wastes prevents the easy access of leaching agents, (2) some waste streams with large volumes make the thermal desorption process expensive, and (3) the treatment of some waste streams are technically difficult because of the nature of the wastes.

Mercury removal from offgas in vitrifiers and in mercury thermal desorption processes is usually accomplished through activated carbon adsorption. However, the carbon-based adsorbents are only effective enough to remove 75 to 99.9% of the mercury with a loading capacity equivalent to 1-20% of the mass of the adsorber material. A last step, mercury amalgamation using expensive gold, usually is needed to achieve the EPA air release standard. A carbon bed usually is used later in the offgas system, where the temperature is generally lower than 250° F. In the sulfur impregnated carbon process, mercury is adsorbed to the carbon, which is much weaker than the covalent bond formed with, for instance, surface functionalized mesoporous material. As a result, the adsorbed mercury needs secondary stabilization because the mercury-laden carbon does not have the desired long-term chemical durability due to the weak bonding between the mercury and active carbon. In addition, a large portion of the pores in the activated carbon are large enough for the entry of microbes to solubilize the adsorbed mercury-sulfur compounds. The mercury loading is limited to about 0.2 g/g of the materials.

The microemulsion liquid membrane technique uses an oleic acid microemulsion liquid membrane containing sulfuric acid as the internal phase to reduce the wastewater mercury concentration from about 460 ppm to about 0.84 ppm. However, it involves multiple steps of extraction, stripping, demulsification, and recovery of mercury by electrolysis and uses large volumes of organic solvents. The liquid membrane swelling has a negative impact on extraction efficiency.

The slow kinetics of the metal-ion exchanger reaction requires long contacting times. This process also generates large volumes of organic secondary wastes. One ion exchange process utilizes Duolite™ GT-73 ion exchange organic resin to reduce the mercury level in wastewater from about 2 ppm to below about 10 ppb. Oxidation of the resin results in substantially reduced resin life and an inability to reduce the mercury level to below the permitted level of less than about 0.1 ppb. The mercury loading is also limited because the high binding capacity of most soils to mercury cations makes the ion-exchange process ineffective, especially when the large amounts of $Ca^{2+}$ from soil saturate the cation capacity of the ion exchanger. In addition, the mercury-laden organic resin does not have the ability to resist microbe attack. Thus, mercury can be released into the environment if it is disposed of as a waste form. In addition to interference from other cations in the solution besides the mercury-containing ions, the ion exchange process is simply not effective in removing neutral mercury compounds, such as $HgCl_2$, $Hg(OH)_2$, and organic mercury species, such as methylmercury, which is the most toxic form of mercury. This ion-exchange process is also not effective in removing mercury from non-aqueous solutions and adsorbing liquids.

The reported removal of metal from water by colloid precipitate flotation reduces mercury concentration from about 160 ppb to about 1.6 ppb. This process involves the addition of HCl to adjust the wastewater to pH 1, addition of $Na_2S$ and oleic acid solutions to the wastewater, and removal of colloids from the wastewater. In this process, the treated wastewater is potentially contaminated with the $Na_2S$, oleic acid, and HCl. The separated mercury needs further treatment to be stabilized as a permanent waste form.

Acidic halide solution leaching and oxidative extractions can also be used in mobilizing mercury in soils. For example $KI/I_2$ solutions enhance dissolution of mercury by oxidization and complexation. Other oxidative extractants based on hypochlorite solutions have also been used in mobilizing mercury from solid wastes. Nevertheless, no effective treatment technology has been developed for removing the mercury contained in these wastes. Since leaching technologies rely upon a solubilization process wherein the solubilized target (e.g. mercury) reaches a dissolution/precipitation equilibrium between the solution and solid wastes, further dissolution of the contaminants from the solid wastes is prevented once equilibrium is reached. In addition, soils are usually a good target ion absorber that inhibits the transfer of the target ion from soils to solution.

The removal of mercury from nonaqueous liquids, adsorbed liquids, soils, or partially-or-fully-stabilized sludge at prototypic process rates has been lacking. This is mainly because the mercury contaminants in actual wastes are much more complicated than the mercury systems addressed by many laboratory-scale tests that are usually developed based on some simple mercury salts. The actual mercury contaminants in any actual wastes almost always contain inorganic mercury (e.g., divalent cation $Hg^{2+}$, monovalent $Hg_2^{2+}$, and neutral compounds such as $HgCl_2$, $Hg[OH]_2$,); organic mercury, such as methylmercury (e.g., $CH_3 HgCH_3$ or $CH_3 Hg^+$) as a result of enzymatic reaction in the sludge; and metallic mercury, because of reduction. Since many laboratory technologies are developed for only one form of mercury, demonstrations using actual wastes are not be successful.

Other metals that are of interest for remediation and industrial separations include but are not limited to silver, lead, uranium, plutonium, neptunium, americium, cadmium and combinations thereof. Present methods of separation include but are not limited to ion exchangers, precipitation, membrane separations, and combinations thereof. These methods usually have the disadvantages of low efficiencies, complex procedures, and high operation costs.

Accordingly, it would be advantageous to provide an apparatus and method that can be used to remove heavy metals, such as mercury, cadmium, and lead from complex waste fluids, such as produced water, in a significant amount and in a cost effective manner.

SUMMARY OF THE INVENTION

The present invention, in one embodiment, provides an apparatus for use in the treatment of contaminated fluid. The apparatus, in an embodiment, includes a body portion, made from a mixture of a waste adsorbent material and a binder material, for use in the removal of contaminants. The adsorbent material may be a nanosorbent material manufactured from self-assembled monolayers on mesoporous supports (SAMMS). The binder material, on the other hand, may include any thermoplastic material capable of binding the adsorbent material together to subsequently provide a composite material that can be shaped into a block. The apparatus may also be provided with an upper end cap placed over a top end of the body portion. An opposing lower end cap may similarly be placed over a bottom end of the body portion. The lower end cap, however, may include an aperture in axial alignment with a pathway provide along an axis of the body portion to permit treated fluid to exit the apparatus. To assist in the removal solid waste/contaminants, so that the body portion can remain substantially porous to fluid flow for an extended period, in one embodiment, an outer element substantially tubular in shape for initially removing the solid contaminants can be provided substantially circumferentially about the block.

The present invention, in another embodiment, provides a method of manufacturing an apparatus for use in the treatment of contaminated fluid. A mixture of a powder or granular material comprising particles of a relatively low softening temperature binder, and particles of a higher softening temperature adsorbent material such as, for example, SAMMS may initially be provided. In one embodiment, the binder material may be provided in an amount of at least about 3 percent by weight of the mixture. The mixture may then be thoroughly mixed so that a substantially uniform mixture of the binder and adsorbent material may be provided. The mixture may next be heated to a temperature substantially above the softening temperature of the binder material but below that of the adsorbent material. Thereafter, sufficient pressure and at least some finite amount of shear may be applied to the heated mixture for a short period of time to cause forced point-bonding. The mixture may subsequently be rapidly cooled to lower the temperature of the resulting mass to that below the softening point of the binder to substantially solidify the mass in form. The substantially solid mass may then be extruded into a block or pressed into a mold to subsequently provide a block. Subsequent to its formation, a substantially solid upper end cap may then be placed over the block at its top end and secured thereto. Thereafter, a lower end cap having a aperture there in may be secured over the block at its bottom end. If desired, an outer filter element may be placed circumferentially about the block for removal of solid contaminants.

The present invention further provides a method for treatment of contaminated fluid. The method includes providing a body portion, made from a mixture of a waste adsorbent material and a binder material, for use in the removal of contaminants. In an embodiment, a pathway may be provided longitudinally through the block. Next, contaminated fluid may be directed to flow into the block and across the adsorbent material to permit interaction between the contaminated fluid and the adsorbent to initiate removal of the contaminants. The treated fluid may then be allowed to move into the pathway where the treated fluid may be directed out of the apparatus in a direction substantially perpendicular to the flow of fluid into the apparatus.

DESCRIPTION OF SPECIFIC EMBODIMENTS

Figure 1:
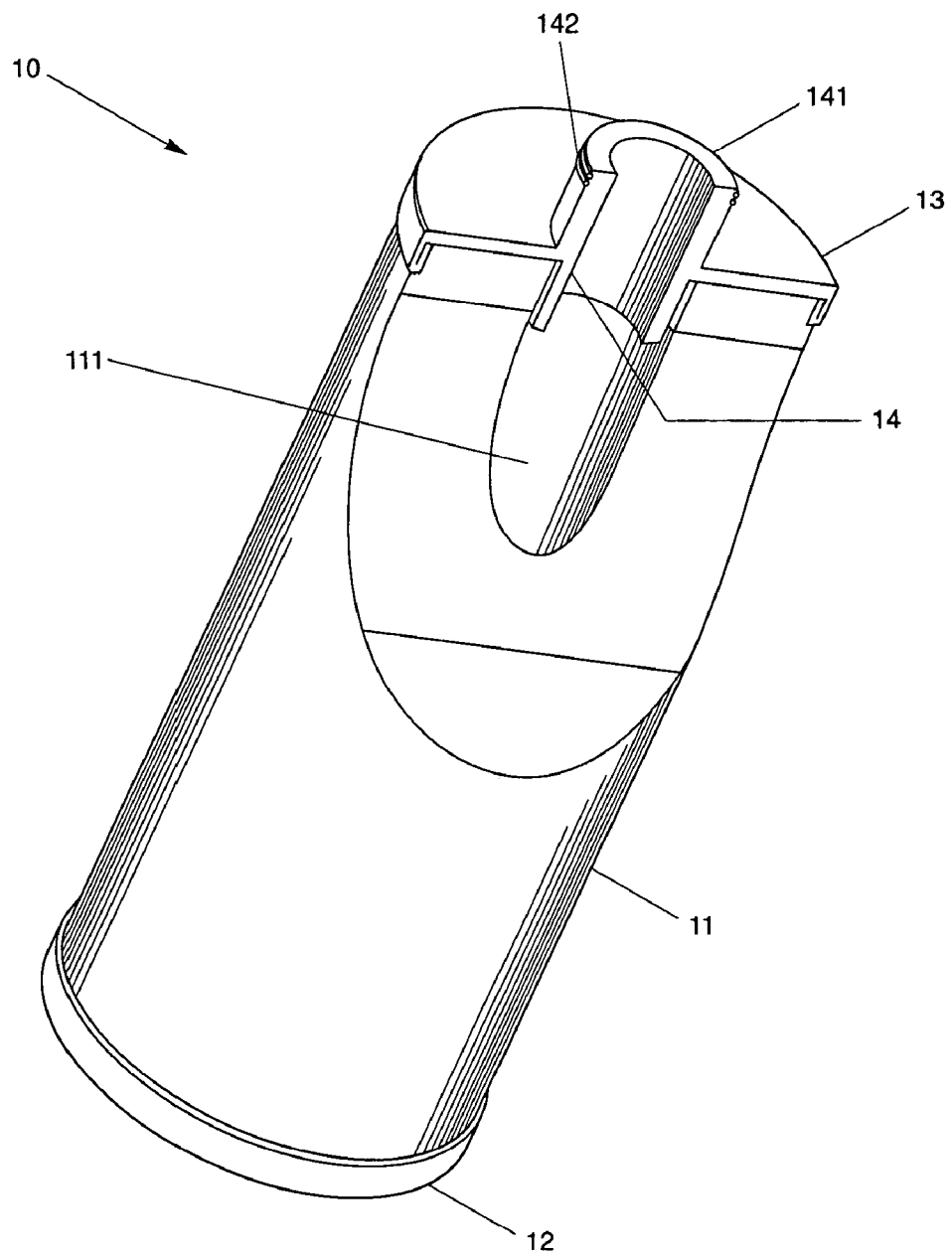
FIG. 1 illustrates an apparatus for use in the treatment of contaminated fluids in accordance with one embodiment of the present invention.

With reference now to FIG. 1, the present invention provides, in one embodiment, an apparatus 10 through which contaminated fluid may be directed for subsequent removal of contaminants within the fluid therefrom. Fluids which may be treated in connection with the present invention may be viscous, such as oil, or non-viscous, such as a liquid or a gas. Contaminants that may be removed by the system of the present invention includes heavy metals, such as mercury, cadmium, arsenic, and lead from complex waste fluids, such as produced water, and mercury from a variety of waste solutions and contaminated waste oils.

Figure 3:
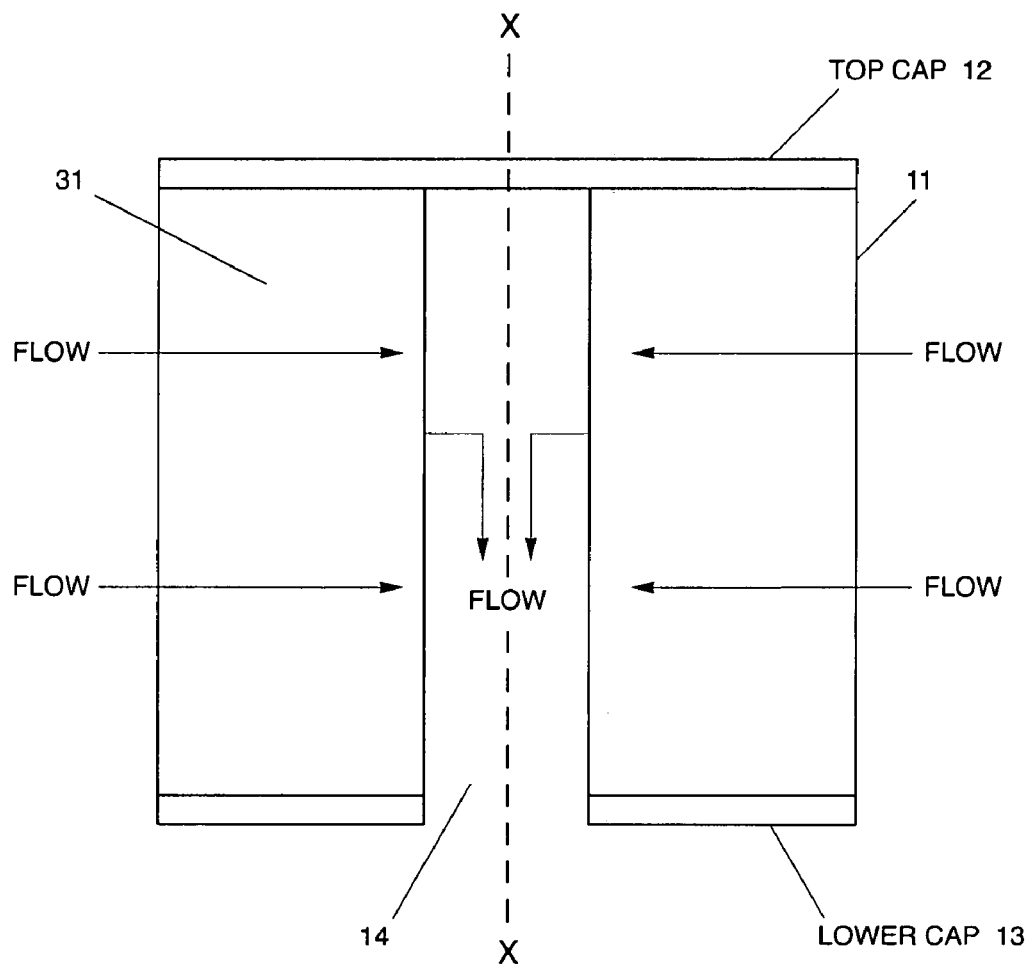
FIG. 3 illustrates a schematic diagram of fluid flow through the apparatus in FIG. 1.

The apparatus 10, in an embodiment, includes a substantially tubular body portion 11 defined by a composite material designed for removing contaminants from fluids. Although illustrated as being substantially tubular, it should be appreciated that body portion 11 may be provided with any geometric shape. The composite material defining the body portion 11, in one embodiment, may include a mixture of a waste adsorbent material and a binder material. The presence of the adsorbent material bound by the binder material can create a matrix 31 of substantially tortuous paths (see FIG. 3) through which contaminated fluid must flow and within which contaminants can be trapped.

In one embodiment, the waste adsorbent material may be a nanosorbent material (i.e., adsorbent nanomaterial) manufactured from self-assembled monolayers on mesoporous supports (SAMMS). It should be appreciated that reference to the term "adsorbent material" hereinafter includes nanosorbent material or adsorbent material, either of which may be used interchangeably with the other. The mesoporous supports, in one embodiment, may be made from various porous materials, including silica. An example of a SAMMS material that can be used in connection with body portion 11 of the present invention includes thiol-SAMMS, such as that disclosed in U.S. Pat. No. 6,326,326, which patent is hereby incorporated herein by reference.

In accordance with one embodiment of the present invention, the adsorbent material may be porous particles ranging from about 5 microns to about 200 microns in size. In one embodiment, the particles, on average, range from about 50 microns to about 80 microns in size, include a pore size ranging from about 2 nanometers (nm) to about 7 nm, and may be provided with an apparent density of ranging from about 0.2 grams/milliliter to about 0.4 grams/milliliter.

The binder material, on the other hand, may be particles ranging from about 0.1 microns to about 250 microns, that can act to bind the adsorbent material together to subsequently provide a composite material that can be shaped into a block. Examples of a suitable binder material can include any thermoplastic material, including, for example, polyolefins such as polyethylene, polypropylene, polybutene-1, and poly-4-methyl-pentene-1; polyvinyls such as polyvinyl chloride, polyvinyl fluoride, and polyvinylidene chloride; polyvinyl esters such as polyvinyl acetate, polyvinyl propionate, and polyvinyl pyrrolidone; polyvinyl ethers; polyvinyl sulfates; polyvinyl phosphates; polyvinyl amines; polyoxidiazoles; polytriazols; polycarbodiimides; copolymers and block interpolymers such as ethylene-vinyl acetate copolymers; polysulfones; polycarbonates; polyethers such as polyethylene oxide, polymethylene oxide, and polypropylene oxide; polyarylene oxides; polyesters, including polyarylates such as polyethylene terphthalate, polyimides, and variations on these and other polymers having substituted groups such as hydroxyl, halogen, lower alkyl groups, lower alkoxy groups, monocyclic aryl groups, and the like and other thermoplastic meltable solid materials. In one embodiment, the binder material may be polyethylene, such as that from the USI Division of Quantum Chemical Corporation.

Still looking at FIG. 1, apparatus 10 may also include an upper end cap 12 positioned over body portion 11 at its top end. In one embodiment, the upper cap 12 may be a substantially solid cap, so as to minimize fluid within body portion 11 from flowing through a top end of apparatus 10. Apparatus 10 may further include an opposing lower end cap 13 placed over the body portion 11 at its bottom end. The lower cap 13, however, may include an aperture 14 designed to permit treated fluid to exit from apparatus 10. To facilitate exit of treated fluid from apparatus 10, body portion 11 may be provided with a pathway 111 extending substantially longitudinally between top and bottom ends of body portion 11. In an embodiment, pathway 111 may be in substantial alignment with aperture 14 of lower cap 13.

Lower cap 13, in an embodiment, may be fitted with an engagement mechanism 141 extending from aperture 14. Engagement mechanism 141, as shown in FIG. 1, permits apparatus 10 to securely engage a substantially complementary passageway 25 within a vessel 20 (see FIG. 2) designed to direct the flow of contaminated fluid into apparatus 10, across body portion 11 for treatment, and into pathway 111 in body portion 11 to exit the apparatus. To permit a substantially fluid tight engagement between the mechanism 141 and complementary passageway 25, a seal 142, such as an O-ring, may be provided on engagement mechanism 141. Of course, more than one O-ring may be used, as illustrated in FIG. 1, if necessary or desired.

The upper end cap 12 and lower end cap 13, in an embodiment, may be manufactured from a rigid material. Examples of such a rigid material includes, metals, plastics, or other synthetic material, such as polyester, polypropylene or nylon.

In manufacturing apparatus 10, body portion 11 may initially be generated. Specifically, a mixture of a powder or granular material comprising particles of a relatively low softening temperature binder, such as, for example, polyethylene, and particles of a higher softening temperature adsorbent material such as, for example, SAMMS may be provided. In one embodiment, the binder material may be provided in an amount of at least about 3 percent by weight of the mixture. This mixture, in an embodiment, may initially be preheated. In addition, the mixture may be thoroughly mixed so that a substantially uniform mixture of the binder and adsorbent material may be provided. This is important to insure that the binder is sufficiently evenly distributed throughout the adsorbent material such that, upon later conversion, the binder can act to entrap or bond to substantially all of the adsorbent material. Moreover, thorough mixing can produce a mixture where the binder particles can assume a stable attachment to the adsorbent material. Such attachment to the adsorbent material can result in the stabilization of mixture of adsorbent material that may otherwise segregate as a result of differences in density or particle morphology. In one embodiment, the binder material can have a slight inherent tackiness or an artificial tackiness may be created by addition of a tackifier into the mixture The preheated mixture, may then be exposed to additional heat, so as to raise its temperature to a desired processing temperature. In an embodiment, the processing temperature may be substantially above the softening temperature of the binder material, preferably at least about 25° C. above the softening point of the binder material, but below the softening temperature of the adsorbent material.

Thereafter, sufficient pressure and at least some finite amount of shear may be applied to the heated mixture for a short period of time, so as to cause forced point-bonding. In other words, application of pressure, while simultaneously heating, forces the mixture to coalesce into a substantially solid mass. The mixture may subsequently be rapidly cooled to lower the temperature of the mass to that below the softening point of the binder. In one embodiment a cooling fluid (e.g., water ranging from about 90° F. to about 120° F.) may be passed over the polymeric mass, so as to cause the polymeric mass to substantially solidify in form, but still malleable.

The malleable mass may then be extruded into body portion 11 or pressed into a mold to subsequently provide body portion 11. Alternatively, the heated mixture may first be extruded into the body portion 11, then subsequently cooled into a substantially solid body portion. In an embodiment, body portion 11 may be provided with a length ranging from about 4 feet to about 5 feet long. Of course, other lengths may be used depending on the particular commercial application that is being carried out. Alternatively, body portion 11 may formed in the manner disclosed in U.S. Pat. No. 5,189,092, which patent is hereby incorporated herein be reference. Once body portion 111 has been formed, if desired, pathway 111 may be formed, for instance, by drilling, longitudinally through body portion 11, so as to enhance the exit of treated fluid from body portion 11.

Subsequent to its formation, body portion 11 may be treated in order to functionalize the adsorbent material within body portion 11. Specifically, within the pores of the mesoporous SAMMS (i.e., the adsorbent material), the monolayer of chemical may be functionalized to subsequently bind the molecules of contaminants, such as heavy metals, along with other constituents within the fluid as the fluid flows through the pores.

The upper cap 12 and lower cap 13 may also be generated through, for instance, an injection molding process, or other well known process in the art. Once available, the upper cap 12 may be secured in a device, such as a capper (not shown) so as to expose its inner surface. The upper cap 12 may then be heated using, for instance, radiant heat or some other method, to bring the temperature of the upper cap 12 to near its melting temperature. Body portion 11 may next have its top end placed in contact with the inner surface of the softened upper cap 12. Thereafter, using pressure, body portion 11 may be pressed onto the inner surface of the upper cap 12, so that a substantially permanent joint and seal may be created between the body portion 11 and the upper cap 12.

Once in the upper cap 12 is in place, the lower cap 13 may be secured in the capper device (not shown) where it may heated using, for instance, radiant heat or other methods to bring the temperature of the lower cap 13 to near its melting temperature. The body portion 11 may subsequently have its end opposite that of the upper cap 12 be pressed into an inner surface of the lower cap 13, so that a substantially permanent joint and seal may be created between the body portion 11 and the lower cap 13. To the extent that body portion 11 may be provided with pathway 111, aperture 14 may be aligned with pathway 111 during the capping of body portion 11 with lower cap 13.

It should be noted that instead of after the formation of body portion 11, functionalization of the monolayer within the pores of the mesoporous adsorbent material can be done subsequent to providing body portion 11 with upper and lower caps 12 and 13.

In operation, looking now at FIG. 2, apparatus 10 may be placed within vessel 20, secured in a desired orientation, based on the location of passageway 25 in vessel 20, and subsequently immersed in a flow of contaminated fluid. Contaminated fluid may then be directed through the apparatus 10 where the contaminants can be adsorbed by the waste adsorbent material in body portion 11.

The vessel 20, in accordance with one embodiment of the present invention, includes a housing 21 within which the apparatus 10 may be accommodated. Housing 21, as illustrated in FIG. 2, includes an inlet chamber 22 and an outlet chamber 23 separated by a support plate 24. Support plate 24, in an embodiment, may be designed to include at least one passageway 25 to which the engagement mechanism 141 on the lower cap 13 of apparatus 10 may complementarily engage. Of course, a plurality of passageways 25 may be provided into which a complementary number of apparatus 10 may be securely placed. If desired, a plug or cover may be provided for those passageways 25 not in engagement with an apparatus 10. In an embodiment, the passageway 25 may be equipped with thimbles (not shown) which provide a location for seal 142 on engagement mechanism 141 to be made with the lower end cap 13. To facilitate placement of the apparatus 10 in secured engagement with the passageway 25 within the inlet chamber 22 and removal of apparatus 10 therefrom, the vessel 20 may be provided with a sealable closure 26.

After the apparatus 10 has been placed in secured engagement with passageway 25, and the closure 26 of vessel 20 sealed, contaminated fluid may be directed into the inlet chamber 22 through inlet 221. Once within the inlet chamber 22, contaminated fluid may be directed to flow radially into the apparatus 10. In other words, looking now at FIG. 3, the contaminated fluid may flow into body portion 11 in a direction substantially perpendicularly axis X, which extend longitudinally along body portion 11 and through aperture 14. As the contaminated fluid flows into body portion 11, it may be forced to flow through a matrix 31 of tortuous porous paths (i.e., the tortuous path created by the adsorbent material and binder material) within body portion 11. While doing so, solid contaminants in the fluid may be trapped within matrix 31 and removed from the fluid.

As the fluid comes into contact with the adsorbent material in body portion 11, which in one embodiment, may be mesoporous SAMMS, the meso-porosity of the SAMMS permits the fluid to flow through the pores in the SAMMS. Within these pores, additional contaminants, such as heavy metal (e.g., mercury, arsenic etc.), come in contact with a monolayer of chemical designed to attract and bind the molecules of these contaminants, along with the other constituents of the fluid flow. As such these additional contaminants may be trapped within the SAMMS and removed from the fluid flow.

The resulting treated fluid may next get directed through aperture 14 of lower end cap 13, across passageway 25, and into outlet chamber 23 of vessel 20, where the treated fluid can subsequently be directed out of the housing 21 through outlet 231. If body portion 11 includes pathway 111, treated fluid flowing through body portion 11 may be directed into pathway 111 and subsequently be permitted to flow through aperture 14 of lower end cap 13.

It should be appreciated that the present invention also contemplates the apparatus 10 being used with a vessel where contaminated fluid may flow from within the body portion 11 outward. In other words, contaminated fluid may be introduced initially through the aperture 14, up into the pathway extending the length of body portion 11, and directed radially outward through the matrix 31. Specifically, the fluid flow, from the perspective of FIG. 3, would be from axis X towards the exterior of the body portion 11.

Figure 2:
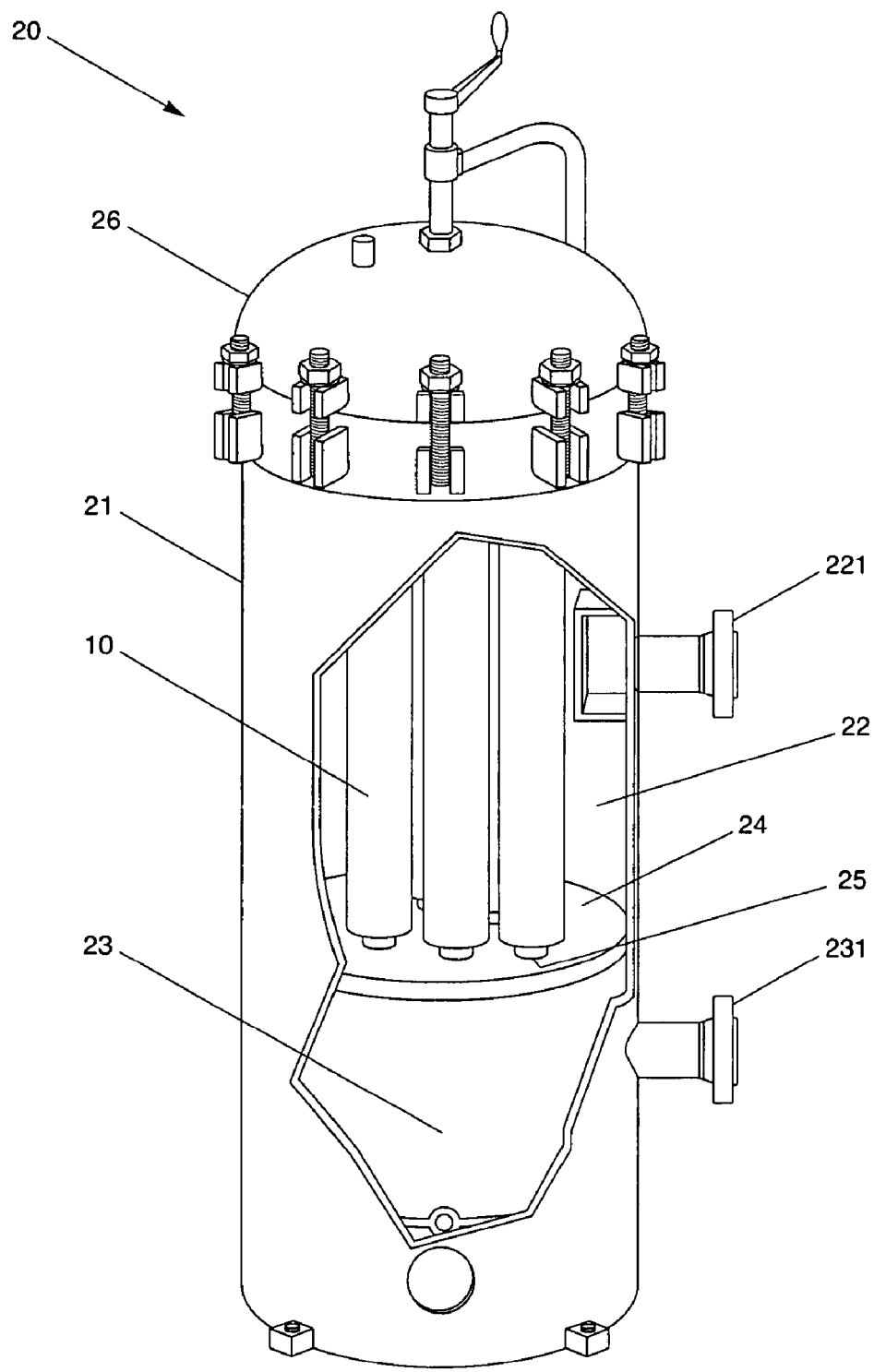
FIG. 2 illustrates a vessel for use with the apparatus shown in FIG. 1.

Moreover, although shown in a vertical position in FIG. 2, it should be appreciated that the vessel 20 may be designed to be in a horizontal position with fluid flow direction adapted to the change accordingly. Moreover, the vessel 20 as noted above, may be manufactured to accommodate a plurality of apparatus 10. In such an embodiment, each apparatus 10 may be designed to have a rated or allowable flow rate therethrough. In particular, the number of apparatuses used may be determined, for instance, by taking a total flow rate to be treated and dividing that by an allowable flow rate for one apparatus. The size of the vessel 20 may then be the size required to place this number of apparatuses 10 in close proximity in housing 21 of the vessel 20.

Once the adsorbent material in body portion 11 of apparatus 10 becomes used up or spent, the vessel 20 may be taken out of service, the apparatus 10 removed, and a new apparatus 10 put in its place. To the extent desired, the spent adsorbent material in body portion 11 may be regenerated. In particular, the spent adsorbent material in body portion 11 may be treated with an acidic fluid to remove the adsorbed contaminant. After this regeneration process, the apparatus 10 may be put back in service to again remove the contaminants. In an embodiment of the invention, the regeneration process may be accomplished with the apparatus 10 in place in the vessel 20.

To determine when the adsorbent material in body portion 11 may be used up, several approaches may be implemented. In one approach, it is known that as the apparatus 10 becomes filled with contaminants, its differential pressure will increase. This is because contaminants in the fluid once trapped by the adsorbent body portion 11 will tend to plug the tightly packed adsorbent material over time. As such, it will be important to monitor the differential pressure of the apparatus 10.

In another approach, the status of the adsorbent material in body portion 11 may be determined by periodically or continuously monitoring the level of contaminants of the treated fluid in the outlet stream. When the level in the outlet stream increases to a certain point, the apparatus 10 may be changed or regenerated.

Although the primary purpose of the adsorbent material in body portion 11 is to adsorb particular contaminants, such as heavy metals, due to its small size (i.e., from about 5 microns to about 200 microns), the adsorbent material in body portion 11 may also be a very good solids filter. This ability to filter solids can result in the adsorbent material be spent or plugged sooner than otherwise necessary.

Figure 4:
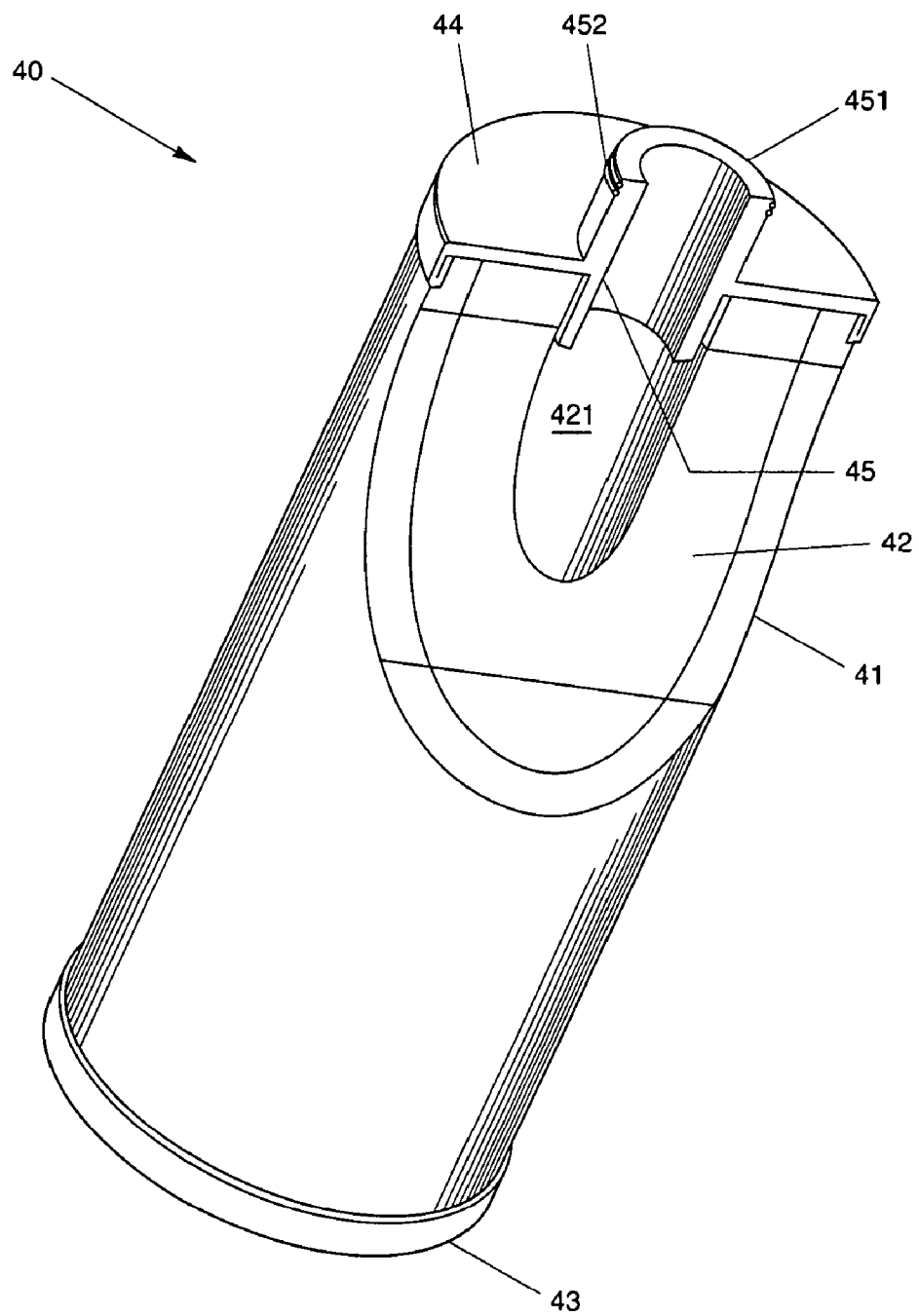
FIG. 4 illustrates, in accordance with another embodiment of the present invention, another apparatus for use in the treatment of contaminated fluids.

To minimize the number of occurrences that body portion 11, and thus apparatus 10, may need to be changed, looking now at FIG. 4, apparatus 40, in an embodiment, may be provided with an outer element 41 circumferentially positioned about body portion 42. The presence of outer element 41, in one embodiment, permits solid contaminants to be removed thereat, while permitting the adsorbent material in body portion 42 to remove the intended contaminants, for instance, heavy metals, without getting substantially blocked or plugged with the solid contaminants.

The outer element 41, in an embodiment, may be substantially tubular in shape and may be made from a fluid permeable material, such as a synthetic material, e.g., polyester, polypropylene, nylon, metal, metal alloy, or a combination thereof, to permit fluid to flow thereacross in a direction toward pathway 421. Other materials from which the outer filter element may be made include inorganic components, like fiberglass or ceramic, microglass, meltblown, micron synthetic, organic cellulose, paper etc. or a combination thereof. An example of such a filter element is disclosed in U.S. Pat. No. 5,827,430, entitled Coreless and Spirally Wound Non-Woven Filter Element, and method of making such a filter element is disclosed in U.S. Pat. No. 5,893,956, entitled Method of Making a Filter Element. Both of these patents are hereby incorporated herein by reference. Alternatively, the outer element 41 may simply be a mesh or a fluid permeable material made from for instance, metals or metal alloys to retain the body portion 42 in apparatus 40.

In one embodiment, the outer element 41 may be provided with a diameter (i.e., Outside Diameter (OD) of apparatus 40) ranging from about from 3 inches to about 6 inches. In large part, the OD may be determined by the permeability of an adsorbent material used in connection with apparatus 40, which can determine an allowable flux rate through the apparatus 10 and the differential pressure across the outer element 41. Alternatively, it may be necessary to provide the outer element 41 with a smaller OD should the adsorbent material be lower in its permeability. In addition, outer element 41 of apparatus 40 may be provided with a thickness ranging from about 0.25 inch to about 1 inch. Of course, the OD, thickness, and other size related dimensions of the outer element 41 may be varied depending on the particular application, and the environment within which the apparatus 10 is used.

Although the outer element 41 may be provided in the manner and with the materials set forth above, it should be appreciated that similar functionality may be obtained using other depth media, such as meltblown, spunbond, or fiberglass.

To maintain the position of body portion 42 within the outer element 41, apparatus 40 may be provided with an upper end cap 43 positioned over both the outer element 41 and body portion 42 at their top ends. Similar to upper cap 15 of apparatus 10, upper end cap 43 may be a substantially solid cap, so as to minimize fluid within apparatus 40 from flowing through a top end of apparatus 40.

Still referring to FIG. 4, an opposing lower end cap 44 may also be placed over both body portion 42 and the outer element 41 at their bottom ends. Lower end cap 44, similar to lower cap 13 of apparatus 10, may include an aperture 45 to permit treated fluid to exit the apparatus 40. Lower end cap 44, in an embodiment, may also be fitted with an engagement mechanism 451 extending from aperture 45. Engagement mechanism 451, as shown in FIG. 4, permits apparatus 40 to securely engage a substantially complementary passageway, such as passageway 25 within a vessel 20 (see FIG. 2). To permit a substantially fluid tight engagement between the mechanism 451 and complementary passageway 25, a seal 452, such as an O-ring, may be provided on engagement mechanism 451. Of course, more than one O-ring may be used, as illustrated in FIG. 4.

In accordance with another embodiment, an inner element (not shown) may be provided in substantial concentric relations to the outer element 41, such that the body portion 42 may be sandwiched between the inner element and the outer element 41. In this embodiment, the inner element would define pathway 421 along a surface of the inner element and may be made from a permeable material similar to the materials used in the fabrication of outer element 41.

In use, once the apparatus has been place in a vessel similar to vessel 20 in FIG. 2, contaminated fluid may be directed to flow across the outer filter element 41 and into the apparatus 40 in a direction toward pathway 421. As the contaminated fluid flows across the outer element 41, it may be forced to flow through a matrix of tortuous paths within the outer element 41, so that solid contaminants may be trapped within the outer element 41 and removed from the fluid. Once through the outer element 41, the fluid comes into contact with the body portion 42 and continues to flow in a direction toward pathway 421. In the presence of the adsorbent material, which in one embodiment, may be mesoporous SAMMS, the meso-porosity of the SAMMS within body portion 42 permits the fluid to flow through the pores in the SAMMS. Within these pores, additional contaminants, such as heavy metal (e.g., mercury, arsenic etc.) come in contact with a monolayer of chemical designed to attract and bind the molecules of these contaminants, along with the other constituents of the fluid flow. As such these additional contaminants may be trapped within the SAMMS and removed from the fluid flow.

The resulting treated fluid may move down body portion 42 and if provided, into pathway 421 extending longitudinally through body portion 42. Thereafter, the treated fluid may be directed out of apparatus 40 through aperture 45 of lower end cap 44.

Of course similar to apparatus 10, apparatus 40 may be used to permit contaminated fluid to flow from within apparatus 40 outward. That is, contaminated fluid may flow into pathway 421, across the body portion 42, and out through the outer element 41.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains.

What is claimed is:

1. A method of treating contaminated fluid, the method comprising:
    providing an apparatus having a substantially tubular body portion into which contaminated fluid flows, a composite material defining the body portion and having a mixture of a porous adsorbent material having nanometer sized pores and a binder material, and a matrix of substantially tortuous paths imparted by adhesion of the porous adsorbent material and binder material and within which contaminants in the fluid can be removed as fluid flows therealong;
    immersing the apparatus within a flow of contaminated fluid;
    directing the contaminated fluid to flow into the body portion and through the matrix of tortuous paths, so as to remove contaminants from the fluid flow; and
    allowing treated fluid to exit the body portion and out of the apparatus for collection.

2. A method as set forth in claim 1, wherein the adsorbent material includes a porous particle made from self-assembled monolayers on mesoporous supports (SAMMS).

3. A method as set forth in claim 1, wherein the contaminated fluid is viscous in nature.

4. A method as set forth in claim 3, wherein the viscous fluid includes one of oils, waste oils, other fluid viscous in nature, or a combination thereof.

5. A method as set forth in claim 1, wherein the contaminated fluid is non-viscous in nature.

6. A method as set forth in claim 5, wherein the non-viscous fluid is a liquid or a gas.

7. A method as set forth in claim 5, wherein the non-viscous fluid is produced water.

8. A method as set forth in claim 1, wherein the step of directing further includes directing the fluid through the adsorbent material, so that additional contaminants, different from those already removed, can be removed from the fluid.

9. A method as set forth in claim 8, wherein, in the step of further directing, the additional contaminants include heavy metals.

10. A method as set forth in claim 8, wherein, in the step of further directing, the additional contaminants include mercury, silver, lead, uranium, plutonium, neptunium, americium, arsenic, cadmium, or a combination thereof.

11. A method as set forth in claim 1, wherein the step of directing includes permitting the contaminated fluid to flow inward from outside the body portion.

12. A method as set forth in claim 1, wherein the step of directing includes permitting the contaminated fluid to flow outward from within the body portion.

13. A method as set forth in claim 1, wherein the step of allowing includes directing the treated fluid to flow along a pathway providing along a length of the body portion.

* * * * *